US006153120A

United States Patent [19]

Scialla et al.

[11] Patent Number: 6,153,120

[45] Date of Patent: Nov. 28, 2000

[54] BLEACHING COMPOSITIONS

[75] Inventors: Stefano Scialla, Rome; Andrea Briatore, Ardea Savona; Gloria Di Capua, Ardea, all of Italy

[73] Assignee: The Procter & Gamble Company, Cincinnati, Ohio

[21] Appl. No.: 09/242,271

[22] PCT Filed: Aug. 1, 1997

[86] PCT No.: PCT/US97/12857

§ 371 Date: Feb. 23, 1999

§ 102(e) Date: Feb. 23, 1999

[87] PCT Pub. No.: WO98/06814

PCT Pub. Date: Feb. 19, 1998

[30] Foreign Application Priority Data

Aug. 12, 1996 [EP] European Pat. Off. .............. 96870105

[51] Int. Cl.[7] ............................ C01B 11/06; C01B 11/04; D06L 3/06

[52] U.S. Cl. ................................ 252/187.26; 252/187.25; 252/187.27; 252/187.28; 252/187.34; 252/187.2; 8/108.1

[58] Field of Search ............................ 252/187.2, 187.24, 252/187.25, 187.26, 187.27, 187.33, 187.34, 187.28; 8/108.1

[56] References Cited

U.S. PATENT DOCUMENTS

| | | | |
|---|---|---|---|
| 4,681,696 | 7/1987 | Bruegge et al. | 252/187.26 |
| 4,867,896 | 9/1989 | Elliott et al. | 252/187.26 |
| 4,911,857 | 3/1990 | Machin et al. . | |
| 5,169,552 | 12/1992 | Wise . | |
| 5,205,954 | 4/1993 | Ahmed et al. . | |
| 5,348,682 | 9/1994 | Finley et al. | 252/187.24 |
| 5,529,711 | 6/1996 | Brodbeck et al. | 252/187.25 |
| 5,597,789 | 1/1997 | Sadlowski | 510/230 |
| 5,981,457 | 11/1999 | Ahmed | 510/223 |

*Primary Examiner*—Joseph D. Anthony
*Attorney, Agent, or Firm*—Jason J. Camp; T. David Reed

[57] ABSTRACT

The present invention relates to hypohalite bleaching compositions comprising a pH buffering component and an ingredient having the ability to prevent the precipitation of the salts of said buffering component upon dilution of the composition in water. Fabric whiteness as well as fabric safety are improved.

11 Claims, No Drawings

BLEACHING COMPOSITIONS

FIELD OF THE INVENTION

The present invention relates to bleaching compositions, in particular to hypochlorite bleaching compositions, suitable for use in laundry applications such as hand and machine laundry methods.

BACKGROUND OF THE INVENTION

Bleaching compositions are well-known in the art. Amongst the different bleaching compositions available, those relying on bleaching by hypohalite bleaches such as hypochlorite are often preferred, mainly for performance reasons, especially at lower temperature.

However, a problem encountered with the use of hypochlorite based-compositions is the resulting damage and/or yellowing of the fabrics being bleached.

It is therefore an object of the invention to provide a hypohalite-containing composition, suitable for use in laundry applications, which provides improved fabric whiteness to fabrics treated therewith.

It is another object of the invention to provide a hypohalite-containing composition, suitable for use in laundry applications, which provides improved fabric safety to fabrics treated therewith.

To fulfill such needs, pH buffering components such as silicates have been incorporated in hypochlorite compositions. A typical disclosure can be found in EP-A-0,653,483.

The Applicant has thus now surprisingly found that this problem is solved by the use, in a hypohalite bleaching composition containing a pH buffering component, of an ingredient having the ability to prevent the precipitation of the salts of said buffering component upon dilution of the composition in water. Indeed, it has been found that improved fabric whiteness and/or safety were obtained with the composition of the invention compared to hypohalite compositions containing a pH buffering component but no ingredient having the ability to prevent the precipitation of the salts of said buffering component upon dilution of the composition in water.

Another advantage of the compositions of the invention is that they are chemically stable. By "chemically stable", it is meant that the hypohalite bleaching compositions of the present invention should not undergo more than 15% loss of available chlorine after 5 days of storage at 50° C.±0.5° C. The % loss of available chlorine may be measured using the method described, for instance, in "Analyses des Eaux et Extraits de Javel" by "La chambre syndicale nationale de L'eau de Javel et des produits connexes", pages 9–10 (1984). Said method consists in measuring the available chlorine in the fresh compositions, i.e. just after they are made, and in the same compositions after 5 days at 50° C.

A further advantage of the compositions of the invention is that they are suitable for the bleaching of different types of fabrics including natural fabrics (e.g., fabrics made of cotton, viscose, linen, silk and wool), synthetic fabrics such as those made of polymeric fibers of synthetic origin as well as those made of both natural and synthetic fibers. Indeed, the compositions of the present invention may be used on synthetic fibers despite a standing prejudice against the use of hypohalite bleaches, especially hypochlorite bleaches, on synthetic fibers, as evidenced by warning on labels of commercially available hypochlorite bleaches and clothes.

SUMMARY OF THE INVENTION

The present invention is a liquid bleaching composition comprising a) a hypohalite bleach, b) a pH buffering component in an amount of 0.5% to 9% by weight, and c) an ingredient having the ability to prevent the precipitation of the salts of said buffering component upon dilution of the composition in water; with the proviso that where said ingredient is a polyacrylate polymer, the polymer is present in an amount of less than 0.5% by weight.

In another aspect of the invention, a solid bleaching composition is provided comprising:

a) a hypohalite bleach, b) a pH buffering component, and c) an ingredient having the ability to prevent the precipitation of the salts of said buffering component upon dilution of the composition in water.

The present invention also encompasses a process of bleaching fabrics with a composition comprising:

a) a hypohalite bleach, b) a pH buffering component in an amount of 0.5% to 9% by weight, and c) an ingredient having the ability to prevent the precipitation of the salts of said buffering component upon dilution of the composition in water;

where said fabrics are immersed in a bleaching solution formed by diluting said composition in water.

The present invention also encompasses the use, in a hypohalite bleaching composition comprising a pH buffering component, of an ingredient having the ability to prevent the precipitation of the salts of said buffering component upon dilution of the composition in water, for providing improved fabric whiteness and/or safety to the fabrics treated therewith.

DETAILED DESCRIPTION OF THE INVENTION

Hypohalite Bleach

An essential component of the invention is a hypohalite bleach. Hypohalite bleaches may be provided by a variety of sources, including bleaches that are oxidative bleaches and subsequently lead to the formation of positive halide ions as well as bleaches that are organic based sources of halides such as chloroisocyanurates.

Suitable hypohalite bleaches for use herein include the alkali metal and alkaline earth metal hypochlorites, hypobromites, hypoiodites, chlorinated trisodium phosphate dodecahydrates, potassium and sodium dichloroisocyanurates, potassium and sodium trichlorocyanurates, N-chloroimides, N-chloroamides, N-chloroamines and chlorohydantoins.

For liquid compositions, the preferred hypohalite bleaches among the above described are the alkali metal and/or alkaline earth metal hypochlorites selected from the group consisting of sodium, potassium, magnesium, lithium and calcium hypochlorites, and mixtures thereof, more preferably the alkali metal sodium hypochlorite.

For solid compositions, the preferred hypohalite bleaches among the above described are the alkali metal and/or alkaline earth metal hypochlorites selected from the group consisting of lithium hypochlorites, calcium hypochlorites, chlorinated trisodium phosphate dodecahydrates, potassium dichloroisocyanurates, sodium dichloroisocyanurates, potassium trichlorocyanurates, sodium trichlorocyanurates, and mixtures thereof, more preferably sodium dichloroisocyanurates and/or calcium hypochlorite.

Preferably, the liquid compositions according to the present invention comprise said hypohalite bleach such that the content of active halide in the composition is of from 0.1% to 20% by weight, more preferably from 2% to 8by weight, most preferably from 3% to 6% by weight of the composition.

Preferably, the solid compositions according to the present invention comprise said hypohalite bleach such that the content of active halide in the composition is of from 20% to 95% by weight, more preferably from 25% to 60% by weight of the composition.

pH Buffering Component

A pH buffering component is another essential component for the compositions of the invention. The pH buffering component ensures that the pH of the composition is buffered to a pH value ranging from 7.5 to 13, preferably from 8 to 12, more preferably from 8.5 to 11.5 after the composition has been diluted into 1 to 500 times its weight of water.

Suitable pH buffering components for use herein are selected from the group consisting of alkali metal salts of carbonates, polycarbonates, sesquicarbonates, silicates, polysilicates, borates, metaborates, phosphates, stannates, alluminates and mixtures thereof, and preferably are selected from the group consisting of sodium carbonate, sodium silicate, sodium borate, and mixtures thereof.

The raw materials involved in the preparation of hypohalite bleaches usually contain by-products, e.g. calcium carbonate resulting in an amount of up to 0.4% by weight of by-product within the hypohalite composition. However, at such amount, the by-product will not have the buffering action defined above.

Liquid bleaching compositions herein will contain an amount of pH buffering component of from 0.5% to 9% by weight, preferably from 0.5% to 5% by weight, and more preferably in an amount of from 0.6% to 3% by weight of the composition.

Solid bleaching compositions herein will preferably contain an amount of pH buffering component of from 3% to 30% by weight, more preferably from 5% to 25% by weight, and most preferably in an amount of from 10% to 20% by weight of the compositiion.

Ingredient Having the Ability to Prevent the Precipitation of the Salts of said Buffering Component upon Dilution of the Composition in Water The other essential component of the invention is an ingredient having the ability to prevent the precipitation of the salts of said buffering component upon dilution of the composition in water. That ingredient, by preventing the precipitation of the salts of said buffering component upon dilution of the composition in water, has surprisingly been found to provide a reduction of the yellowing of the fabrics treated therewith, i.e. improved whiteness, as well as providing improved fabric safety. Naturally, for the purpose of the invention, the ingredient having the ability to prevent the precipitation of the salts of said buffering component upon dilution of the composition in water has to be stable to the hypohalite bleach.

The ability of an ingredient to prevent the precipitation of the salts of the buffering component upon dilution of the composition in water may be measured by the following comparative test:

A composition containing 5% wt. sodium hypochlorite, 1.4% wt. sodium hydroxide, 1.5% wt. calcium carbonate and water (between 10° F. (French Degree) 40° F.) and to balance to 100% wt is prepared. 10 ml of this composition is added to 1 liter of tap water (30° F.). The solution is maintained at 40° C. for 30 min. The precipitates formed are separated from said solution and then dried and weighted. By "separating the precipitates formed", it is meant to filter said solution with an apparatus comprising a peristaltic pump, a vacuum flask and a filter with 0.45 microns porosity.

The above test is repeated with the same composition formulation but with the exception that 0.05% wt. of the ingredient to be tested is added to the composition. Ingredients having the ability to prevent the precipitation of the salts of the buffering component upon dilution of the composition in water will reduce the amount of precipitates formed, as measured according to this method, by more than 50% compared to the same compositions which do not contain the ingredient having the ability to prevent the precipitation of the salts of the buffering component upon dilution of the composition in water.

Preferred ingredients, for the purpose of the invention, are those substantially maintaining their ability to prevent the precipitation of the salts of said buffering component, as defined above, upon dilution of the composition in water after storage in an oven as defined by the oven test method below:

The two compositions defined in the test method above are stored in an oven (Memmert®) at 50° C. for 7 days. After storage, the above test method is repeated, i.e. for each composition 10 ml of the composition is taken and added to 1 liter of tap water (30° F. (French Degree)). The solution is maintained at 40° C. for 30 min. The precipitates formed are separated from said solution and then dried and weighted.

The compositions may also be assessed for their whitening effect and/or safety on the treated fabrics.

The whitening effect, i.e. the yellowing-prevention effect, and/or safety effect of the present invention can be evaluated by comparing the composition according to the present invention to the same composition without the ingredient having the ability to prevent the precipitation of the salts of said buffering component upon dilution of the composition in water.

The degree of yellowing can be determined by both visual and instrumental grading. Visually, the difference in yellowing between items treated with different compositions can be determined by a team of expert panellists. Instrumentally, the assessment can be determined with the help of Colorimeters such as Ganz Griesser® instruments (e.g., Datacolor® Spectraflash® SF 500, Machbet White-eye® 500) or a ZEISS ELREPHO® or others which are available for instance from Hunterlab® or Gardner®.

Fabric safety may be evaluated by different test methods including the degree of polymerisation test method according to UNI (Ente Nazionale Italiano di Unificazione) official method UNI 8282-Determinazione della viscositá intrinseca in soluzione di cuprietilendiammina (CED).

Preferred ingredients which prevent the precipitation of the salts of the buffering component upon silution of the composition in water are of the polymeric type.

Suitable polymers for use herein which prevent the precipitation of the salts of the buffering component upon dilution of the composition in water are polymers comprising monomeric units selected from the group consisting of unsaturated carboxylic acids, polycarboxylic acids, sulphonic acids, phosphonic acids and mixtures thereof. Co-polymerisation of the above monomeric units among them or with other co-monomers such as styrenesulfonic acid is also suitable.

Preferred examples of polymers which prevent the precipitation of the salts of the buffering component upon dilution of the composition in water are the polymers and co-polymers of monomeric units selected from the group consisting of acrylic acid, maleic acid, vinylsulphonic acid and mixtures thereof. Also suitable for use herein are the above mentioned polymers and co-polymers which are modified in order to contain other functional groups such as aminophosphonic and/or phosphonic units. More preferred polymers are selected from the group consisting of polyacrylate polymers, co-polymers of acrylic and maleic acid, co-polymers of styrene sulphonic acid and maleic acid, and mixtures thereof, preferably modified with aminophosphonic and/or phosphonic groups.

The molecular weight for these polymers and co-polymers is preferably below 100,000, most preferably between 500 and 50,000. Most suitable polymers and co-polymers for use herein will be soluble in an amount up to 0.1% by weight, in an aqueous composition comprising 5% by weight of sodium hypochlorite with its pH adjusted to 13 with sodium hydroxide.

Commercially available polymers, suitable for use herein, which prevent the precipitation of the salts of the buffering component upon dilution of the composition in water are the polyacrylate polymers sold under the tradename Good-Rite® from BF Goodrich, Acrysol® from Rohm & Haas, Sokalan® from BASF, Norasol® from Norso Haas. Also suitable for use herein are the co-polymers of styrene sulphonic acid and maleic acid, commercially available under the tradename Versaflex® from National Starch such as Versaflex 157, as wess al Acumer® terpolymers from Rohm and Haas, in particular Acumer® 3100. Preferred commercially available polymers are the polyacrylate polymers, especially the Norasol® polyacrylate polymers and more preferred are the polyacrylate polymer Norasol® 410N (MW 10,000) and the polyacrylate polymer modified with phosphonic groups Norasol® 440N (MW 4000) and its corresponding acid form Norasol® QR 784 (MW 4000).

A preferred polymer for use herein still maintaining its ability to prevent the precipitation of the salts of said buffering component upon dilution of the composition in water after storage in an oven as defined in the above oven test method are the polyacrylate polymer modified with phosphonic groups commercially available under the tradename Norasol® 440N (MW 4000) and its corresponding acid form Norasol® QR 784 (MW 4000) from Norso-Haas.

Mixtures of polymers as herein described may also be used in the present invention.

The ingredient having the ability to prevent the precipitation of the salts of the buffering component upon dilution of the composition in water is preferably present at a low amount, i.e. in an amount of up to 0.5% by weight, more preferably from 0.001% to 0.3% by weight, most preferably from 0.005% to 0.2% by weight of the liquid composition.

Solid compositions of the invention will preferably comprise an amount of said ingredient of from 0.01% to 3% by weight, preferably from 0.05% to 2% by weight of the composition.

The compositions according to the present invention are either in liquid or solid form. Solid forms include forms such as powders, tablets and granules. Preferably, the compositions of the invention are in liquid aqueous form. More preferably, they comprise water in an amount of from 60% to 98% by weight, more preferably of from 80% to 97% and most preferably of from 85% to 97% by weight of the total aqueous liquid bleaching composition.

pH

The pH of the liquid compositions according to the present invention, as is, is typically from 12 to 14 measured at 25° C. Solid compositions or liquid compositions of the invention have a pH of from 7.5 to 13, preferably from 8 to 12, more preferably from 8.5 to 11.5, when diluted into 1 to 500 times its weight of water. It is in this alkaline range that the optimum stability and performance of the hypohalite as well as fabric whiteness and/or safety are obtained. The pH range is suitably provided by the pH buffering component and the hypohalite bleach mentioned hereinbefore, which are alkalis. However, in addition to these components, a strong source of alkalinity may also optionally be used.

Suitable sources of alkalinity are the caustic alkalis such as sodium hydroxide, potassium hydroxide and/or lithium hydroxide, and/or the alkali metal oxides such as sodium and/or potassium oxide. A preferred strong source of alkalinity is a caustic alkali, more preferably sodium hydroxide and/or potassium hydroxide. Typical levels of such caustic alkalis, when present, are of from 0.1% to 1.5% by weight, preferably from 0.5% to 1.5% by weight of the composition.

The composition according to the invention may also comprise further optional components such as perfumes, bleach-stable surfactants, organic or inorganic alkalis, pigments, dyes, optical brighteners, solvents, chelating agents, radical scavengers and mixtures thereof.

Preferably, the compositions of the invention are used in diluted form in laundry applications. The expression "used in diluted form" herein includes dilution by the user, which occurs for instance in hand laundry applications, as well as dilution by other means, such as in a washing machine. Preferably, the composition is diluted into 5 to 500 times its weight of water for hand laundry application and 10 to 500 times its weight of water in a washing machine. Thus, in another aspect of the invention there is provided a process for washing fabrics with a composition as disclosed herein, where said fabrics are immersed in a bleaching solution formed by diluting said composition in water.

In another aspect of the invention, there is provided the use, in a hypohalite bleaching composition comprising a pH buffering component, of an ingredient having the ability to prevent the precipitation of the salts of said buffering component upon dilution of the composition in water for providing improved whiteness and/or safety to the fabrics treated therewith. Accordingly, the present invention also encompasses the use, in a hypohalite bleaching composition comprising a pH buffering component, of an ingredient having the ability to prevent the precipitation of the salts of said buffering component upon dilution of the composition in water, for providing improved whiteness and/or safety to the fabrics treated therewith. By "improved whiteness and/or safety", it is meant that hypohalite bleaching compositions, comprising a pH buffering component and an ingredient having the ability to prevent the precipitation of the salts of said buffering component upon dilution of the composition in water, provide better whiteness, i.e. less yellowing, and/or fabric safety compared to hypohalite bleaching compositions which do not comprise said ingredient.

The invention is illustrated in the following non-limiting example, in which all percentages are on a weight basis unless otherwise stated.

EXAMPLE 1

The following compositions, according to the invention, were prepared:

| Composition (weight %) | 1 | 2 | 3 | 4 | 5 | 6 | 7 | 8 |
|---|---|---|---|---|---|---|---|---|
| Sodium hypochlorite | 5.0 | 5.0 | 5.0 | 2.5 | 2.5 | 2.5 | 5.0 | 5.0 |
| Sodium hydroxide | 0.9 | 0.7 | 0.7 | 0.9 | 0.7 | 0.7 | 0.5 | — |
| Sodium carbonate | 1.2 | 1.2 | 1.2 | 1.2 | 1.2 | 1.2 | — | 1.5 |
| Sodium silicate | — | 0.5 | — | — | 0.5 | — | — | — |
| Sodium metaborate | — | — | 1.0 | — | — | 1.0 | 1.0 | — |
| Norasol QR 784 | 0.1 | 0.1 | 0.1 | 0.1 | 0.1 | 0.1 | 0.1 | 0.1 |
| Water and minors to balance to 100 | | | | | | | | |

EXAMPLE 2

The following compositions are in accordance with the present invention

| Composition (weight %) | 9 | 10 | 11 | 12 | 13 | 14 |
|---|---|---|---|---|---|---|
| Sodium hypochlorite | 5.0 | 5.0 | 5.0 | 2.5 | 2.5 | 2.5 |
| Sodium hydroxide | 0.7 | 0.7 | 0.7 | 0.9 | 0.7 | 0.7 |
| Sodium carbonate | 1.2 | 1.2 | 1.2 | 1.2 | 1.2 | 1.2 |
| Sodium silicate | 0.5 | 0.5 | 0.5 | — | 0.5 | 0.5 |
| Norasol 410N | 0.1 | — | — | 0.1 | — | — |
| Versaflex 157 | — | 0.1 | — | — | — | 0.1 |
| PVSA* | — | — | 0.1 | — | 0.1 | — |
| Water and minors to balance to 100 | | | | | | |

*Poly(vinylsulfonic acid, sodium salt) available from Aldrich (CAS 25053-27-4)

What is claimed is:

1. A process of bleaching fabrics with a composition selected from the group consisting of:

1) a liquid bleaching composition comprising:
   a) a hypohalite bleach in an amount of from 2% to 20% by weight,
   b) a pH buffering component in an amount of 0.5% to 5% by weight, and
   c) from 0.001% to 0.3% by weight of an ingredient having the ability to prevent the precipitation of the salts of said buffering component upon dilution of the composition in water; wherein said ingredient is a polymer selected from the group consisting of polyacrylate polymers, co-polymers of acrylic acid and maleic acid, co-polymers of styrene sulphonic acid and maleic acid, and mixtures thereof; wherein said ingredient has a molecular weight of from 4,000 to 100,000; and wherein said liquid bleaching composition is suitable for use in laundry applications which provide improved fabric safety and whiteness to fabrics treated therewith, and
2) a solid bleaching composition comprising:
   a) a hypohalite bleach in an amount of from 20% to 95% by weight,
   b) a pH buffering component, and
   c) from 0.01% to 3% by weight of an ingredient having the ability to prevent the precipitation of the salts of said buffering component upon dilution of the composition in water; wherein said ingredient is a polymer selected from the group consisting of polyacrylate polymers, co-polymers of acrylic acid and maleic acid, co-polymers of styrene sulphonic acid and maleic acid, and mixtures thereof; wherein said ingredient has a molecular weight of from 4,000 to 100,000; and wherein said solid bleaching composition is suitable for use in laundry applications which provide improved fabric safety and whiteness to fabrics treated therewith;

where said fabrics are immersed in a bleaching solution formed by diluting said composition in water.

2. A liquid bleaching composition comprising:

a) a hypohalite bleach in an amount of from 2% to 20% by weight, b) a pH buffering component in an amount of 5.0% to 5% by weight, and c) from 0.001% to 0.3% by weight of an ingredient having the ability to prevent the precipitation of the salts of said buffering component upon dilution of the composition in water; wherein said ingredient is a polymer selected from the group consisting of polyacrylate polymers, co-polymers of acrylic acid and maleic acid, co-polymers of styrene sulphonic acid and maleic acid, and mixtures thereof; wherein said ingredient has a molecular weight of from 4,000 to 100,000; and wherein said liquid bleaching composition is suitable for use in laundry applications which provide improved fabric safety and whiteness to fabrics treated therewith.

3. A bleaching composition according to claim 1, where said polymer is modified with aminophosphonic and/or phosphonic groups.

4. A bleaching composition according to claim 2, wherein said hypohalite bleach is an sodium hypochlorite.

5. A bleaching composition according to claim 2 wherein said hypohalite, based on active halide, is present in an amount of from 2% to 8% by weight of the liquid composition.

6. A bleaching composition according to claim 2, wherein said composition further comprises an alkali metal oxide salt or an alkali metal hydroxide salt.

7. A bleaching composition according to claim 2 wherein said pH buffering component is selected from the group consisting of alkali metal salts of carbonates, polycarbonates, sesquicarbonates, silicates, polysilicates, borates, metaborates, phosphates, stannates, alluminates, and mixtures thereof.

8. A bleaching composition according to claim 7 wherein said pH buffering component is selected from the group consisting of sodium carbonate, sodium silicates, sodium borate, and mixtures thereof.

9. A solid bleaching composition comprising:

a) a hypohalite bleach in an amount of from 20% to 95% by weight, b) a pH buffering component, and c) from 0.01% to 3% by weight of an ingredient having the ability to prevent the precipitation of the salts of said buffering component upon dilution of the composition in water; wherein said ingredient is a polymer selected from the group consisting of polyacrylate polymers, co-polymers of acrylic acid and maleic acid, co-polymers of styrene sulphonic acid and maleic acid, and mixtures thereof; wherein said ingredient has a molecular weight of from 4,000 to 100,000; and wherein said solid bleaching composition is suitable for use in laundry applications which provide improved fabric safety and whiteness to fabrics treated therewith.

10. A bleaching composition according to claim 9 wherein said hypohalite bleach is sodium dichloroisocyanurate and/or calcium hypochlorite.

11. A bleaching composition according to claim 9 wherein said hypohalite, based on active halide, is present in an amount of from 25% to 60% by weight of the solid composition.

* * * * *